United States Patent Office 3,840,540
Patented Oct. 8, 1974

3,840,540
2-SUBSTITUTED-3,4-DIHYDRO-4-OXOQUIN-
AZOLINES AS HERBICIDES
Beryl William Dominy, Groton, Hans-Jurgen Ernst Hess, Old Lyme, and Richard Carl Koch, East Lyme, Conn., assignors to Pfizer Inc., New York, N.Y.
No Drawing. Continuation-in-part of abandoned application Ser. No. 54,618, July 13, 1970. This application Mar. 13, 1972, Ser. No. 234,372
Int. Cl. C07d 51/48
U.S. Cl. 260—251 QA                    7 Claims

ABSTRACT OF THE DISCLOSURE

Substituted 4(3H)-quinazolinones of the formulae

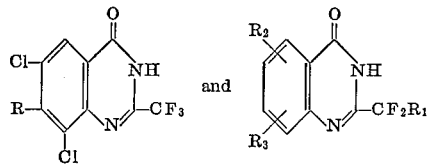

and the alkali metal and alkylamine salts thereof, wherein R is Cl, $CH_3O$, $CH_3$ or carbamyl or mono- or dialkyl-carbamyl wherein each alkyl contains from 1 to 3 carbon atoms; $R_1$ is H, F, Cl, perfluoroalkyl of 2 to 4 carbon atoms or —CXYZ wherein X, Y and Z are each H, F or Cl; $R_2$ is H, F, Cl, Br, I, $CH_3$ or $CF_3$; and $R_3$ is H, $NO_2$, F, Cl or Br, and their use as novel herbicides.

CROSS REFERENCE TO RELATED APPLICATIONS

This application is a continuation-in-part of copending application Ser. No. 54,618 filed July 13, 1970, now abandoned.

BACKGROUND OF THE INVENTION

This invention concerns a novel series of 4(3H)-quinazolinones and their use as herbicides.

Weeds, which can be broadly defined as any undesirable plants, cause considerable economic losses annually and are also objectionable for aesthetic reasons. Considerable effort is expended annually for removing and controlling the growth of weeds along highways, railway beds and in parks and gardens. Of most concern, however, is their interference with the growth of agricultural crops, thereby increasing the cost of producing these crops. Weeds are generally eliminated mechanically, such as by actual physical removal from the ground or by means of chemicals. Initially, the chemicals used for weed control were inorganic compounds, in particular the chlorates, chlorides and arsenites. These compounds are usually nonselective herbicides and kill all living plants. In the 1940's, attention was directed to more selective herbicides which would only destroy undesirable plants and cause little damage to agricultural crops. Most of these new herbicides were organic compounds and the first one developed, 2,4-D (2,4-dichlorophenoxyacetic acid) and its derivatives, is still widely used today for weed control.

In the interest of economy and selectivity, many other prototype organic structures have been examined for herbicidal activity. A limited series of quinazolines including 4-ethylamino-, 4-diethylamino-, 2-chloro-4-ethylamino and 2-chloro-4-diethylaminoquinazoline are claimed as plant-growth regulators, British Pat. No. 822,069. In 1964–1965, Deysson et al., Compt. Rend., 259 (2), 479 (1964), Ann. Pharm. Franc., 23, 163, 229 (1965) reported the antimitotic properties of 1-methyl-1,4-dihydro, 1-propyl-1,4-dihydro-, 3-methyl-3,4-dihydro-, 3-ethyl-3,4-dihydro, 3-propyl-3,4-dihydro-, and 3-isopropyl-3,4-dihydro-4-quinazolones. U.S. Pat. No. 3,244,503 discloses a series of 3-alkyl and cycloalkyl substituted 2,4(1H,3H)-quinazolinediones, useful as herbicides.

F. I. Abezgauz et al., Zh. Obshch. Khim., 34 (9), 2965 (1964), (C.A. 61, 15996g), describes the synthesis of 2-fluoromethylquinazol-4-one, and Dymek et al., Dissertationes Pharm., 16 (3), 247 (1964), (C.A. 63, 11561c), the corresponding 2-chloromethyl analog. In both cases no utility was disclosed.

R. F. Smith et al., J. Org. Chem., 30, 1312 (1965), describes the chlorination of 2-methyl- and 2-ethylquinazol-4-one employing a phosphorous tri- and pentachloride mixture wherein 2-trichloromethyl- and 2-(1,1-dichloroethyl)-4-chloroquinazoline are formed respectively.

W. L. Armarego et al., J. Chem. Soc., 234 (1966) reports the preparation of a limitetd number of substituted quinazolines including the 2-trifluoromethyl analog thereof. Both groups of investigators failed to disclose a specific utility for their compounds.

More recently, Japanese Pat. 71/24,029 claims a series of 1-substituted-4(1H)-quinazolinones as antitussive, antirheumatic and antiinflammatory agents, while Japanese Pat. 7124030 claims 2,3-disubstituted-4(3H)-quinazolinones as tranquilizers, anticonvulsants and hypotensives.

SUMMARY OF THE INVENTION

It has now been discovered that novel quinazolinones of the formulae:

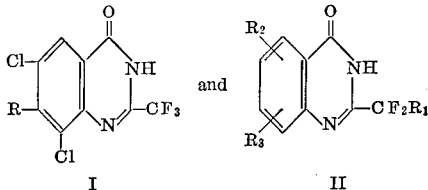

I                        II and the alkali metal and alkylamine salts thereof, where R is Cl, $CH_3O$, $CH_3$ or carbamyl or mono- or dialkyl-carbamyl wherein each said alkyl contains from 1 to 3 carbon atoms; $R_1$ is H, F, Cl, perfluoroalkyl of 2 to 4 carbon atoms or —CXYZ where X, Y and Z are each H, F or Cl; $R_2$ is H, F, Cl, Br, I, $CH_3$ or $CF_3$; and $R_3$ is H, $NO_2$, F, Cl or Br have unexpected utility as herbicidal agents.

The preferred compounds of the present invention include those of formula II wherein $R_1$ is F, $R_2$ and $R_3$ are each H, F, Cl, Br or I.

A second preferred class of compounds are those related to II wherein $R_1$ is CXYZ where X, Y and Z are each H, F or Cl, $R_2$ is hydrogen and $R_3$ is H, F, Cl, Br or I.

Also considered within the purview of this invention are congeners of the above formula II wherein $R_1$ is alkyl of 2 to 4 carbon atoms, Br or I and those where $R_2$ and $R_3$ are each phenyl, $CH_3S$, $CH_3SO$, $CH_3SO_2$, $H_2NCO$—, $H_2NSO_2$—, perfluoroalkyl containing 2 to 5 carbon atoms, $R_4O$—, $R_4CO_2$—, $R_4O_2C$—, $R_4NHCO$—, $R_4CONH$—, $R_4NHSO_2$—, $R_4R_5NCO$— and $R_4R_5NSO_2$— where $R_4$ and $R_5$ considered separately are each alkyl of 1 to 4 carbon atoms and $R_4$ and $R_5$ taken together with the nitrogen atom to which they are attached form a heterocyclic ring of from 4 to 8 carbon atoms. Also within the scope of the instant invention are analogs where $R_2$ and $R_3$ are each

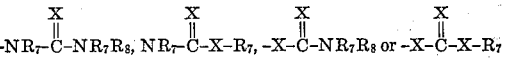

wherein $R_7$ and $R_8$ may be hydrogen, (lower)alkyl or aryl, and X is O or S.

As previously mentioned, the aforesaid compounds have been found to be effective in controlling the growth of weeds; the present invention also comprises a method of inhibiting the growth of weeds by treating the soil before the emergence of the weed or the growing weeds themselves with a herbicidal amount of a compound selected from the groups given above.

DETAILED DESCRIPTION OF THE INVENTION

The novel substituted 4(3H)-quinazolinones of the present invention can be readily prepared by any one of two synthetic procedures. One method involves the conversion of a substituted anthranilic acid, usually with a carboxylic acid anhydride, $(R_1CF_2CO)_2O$, in the presence of a tertiary amine to the intermediate 2-substituted-4H-3,1-benzoxazin-4-one. Any tertiary amine can be used provided that it will not react with the acid anhydride. Generally, trialkyl amines, e.g., triethyl amine or pyridine, are preferred. The 2-substituted-4H-3,1-benzoxazin-4-one intermediate is dissolved in an anhydrous, inert solvent such as chloroform and converted to the corresponding 4(3H)-quinazolinone with ammonia. The solvent is evaporated, the desired product isolated by conventional means from the small amounts of acylanthranilamide that are formed, and purified by crystallization. The carboxylic acid anhydride may be replaced with the appropriate acyl halide, preferably the acid chloride. The reaction may be conducted in any anhydrous, inert solvent. The preferred solvents are tetrahydrofuran, ethyl acetate, 1,4-dioxane or chloroform.

In the alternate method of preparation, the corresponding anthranilamide is acylated in said inert solvent with an acyl halide, preferably the chloride, in the presence of a tertiary amine, such as pyridine, to give, as an intermediate, the 2-acylaminobenzamide. Heating the latter product either neat or in an inert solvent, or on treatment with 1N sodium hydroxide solution causes it to cyclize to the desired substituted 4(3H)-quinazolinone. Alternately, the acyl anhydride or acid can be employed for the acylation. The reaction utilizing the acid halide or anhydride is preferably conducted in an anhydrous, inert solvent such as one of those listed above, while the acylation using the acid is carried out neat.

The requisite anthranilic acids, anthranilamides, and acyl halides used as starting materials in preparing the novel compounds of the present invention are readily prepared by conventional methods well known to those skilled in the art, e.g., according to the methods of Baker et al., *J. Org. Chem.*, 17, 149 (1952) and Sadler et al., *J. Am. Chem. Soc.*, 78, 1251 (1956).

The novel compounds of the present invention have been found to be highly effective herbicides and may be applied to the soil before emergence of the weeds, i.e., pre-emergent herbicides and may also be applied as post-emergent herbicides to weeds already growing in the soil. The preferred compounds of the present invention are 2-trifluoromethyl-6-fluoro-4(3H)-quinazolinone, 2-trifluoromethyl-6,8-dichloro-4(3H)-quinazolinone, 2-perfluoroethyl-4(3H)-quinazolinone and 2 - (2-chloro-1,1,2-trifluoroethyl)-4(3H)-quinazolinone.

Except for the salts, the compounds of the present invention are only slightly water-soluble. For post-emergent application, it is necessary that the herbicides penetrate the waxy integument that covers the surface parts of the weeds. Consequently, it is preferred not to use the water-soluble salts for post-emergent application since these compounds will easily wash off the surface of the weeds. The water-insoluble organic compounds or their alkylamine salts, on the other hand, more readily penetrate the waxy integument and are therefore preferred for post-emergent application. The term alkylamine as employed in the instant invention in meant to encompass mono-, di- and trialkyl amines wherein the alkyl portion contains from 1 to 12 carbon atoms. The preferred alkylamine salts include those formed from dodecylamine and N,N-dimethyldodecylamine.

Because of the need to penetrate the waxy plant integument, it is generally preferred to apply the water-insoluble compounds or their alkylamine salts of the present invention in the form of a lipophilic phase. This can be readily accomplished by dissolving these compounds or their alkylamine salts in water-immiscible organic solvents such as xylene, kerosene or heavy aromatic naphthas, and apply the resultant solutions directly to the weeds. It is frequently desirable to employ isophorone or isopropanol as cosolvents. Alternatively, under certain circumstances, it might be desirable to employ aqueous emulsions or dispersions of these water-immiscible solutions.

For pre-emergent application it is, of course, necessary that the herbicides persist in the soil for a period of time. For this reason, simple water-soluble compounds would not be very effective. However, it has been found, substantial amounts of the water-soluble salts of the compounds of the present invention, after a period of time, will hydrolyze to the water-insoluble free acid form upon contact with the soil. Accordingly, aqueous solutions of the salts of the present invention can be conveniently used for pre-emergent application. The preferred salts for the aforementioned use include the alkali metal salts, especially the sodium and potassium salts.

For both pre- and post-emergence application, the compounds of the present invention or the aforementioned salts thereof may be applied directly or in the form of solutions, suspensions, emulsions, wettable powders (plus oil), flowable powders, dusts, sprays or aerosols. Solutions of the water-soluble compounds or their salts may be prepared from the aforementioned hydrocarbon solvents and such cosolvents as alkanols and ketones. Suspensions or dispersions of the compounds can readily be prepared by suspending the compounds in water with the aid of a wetting or dispersing agent such as the Tweens (polyoxyalkylene derivatives of sorbitan monolaurate), or alternately by dissolving them in a suitable solvent which can then be dispersed in water.

The compounds can also be applied as powders or dust by mixing them or milling them with such inert carriers as talc, diatomaceous earth, Fuller's earth, kaolin and various other clays. Aerosols containing the compounds of the present invention can also be prepared.

For pre-emergent herbicides, the dosage level will vary from ¼ to 10 pounds per acre, the exact amount depending upon the compound under consideration and the particular weed. For post-emergent herbicides, application on a level of ⅛ to 5 pounds per acre is usually adequate.

The following examples are provided to illustrate further the scope of the present invention, and should not be construed as limitations thereof.

EXAMPLE 1

2-trifluoromethyl-6-bromo-4(3H)-quinazolinone
($R_1$=F; $R_2$=H; $R_3$=6-Br)

To an ice cold solution of 9.0 g. (0.0415 mole) of 5-bromoanthranilic acid, 6.5 g. (0.083 mole) of dry pyridine, and 100 ml. of chloroform, is added slowly 17.5 g. (0.083 mole) of trifluoroacetic anhydride. The solution is heated at reflux for 1.5 hours, cooled, and the solution evaporated to dryness. The residue is redissolved in 100 ml. of fresh chloroform and the resulting solution saturated with ammonia. After 30 minutes, the chloroform is evaporated again and the resulting solid triturated with 1N HCl to give 8.0 g. of a solid melting at 240–250° C. The solid is treated with 25 ml. of 1N sodium hydroxide and filtered. The solid which does not dissolve is the corresponding acylanthranalimide. The filtrate is acidified to give 6.5 g. of the desired product as a colorless solid melting at 250–255° C. Recrystallization from chloroform gives 4.5 g. of product; melting point 253–255° C.

*Analysis.*—Calcd. for $C_9H_4BrF_3N_2O$: C, 36.9; H, 1.37; N, 9.58. Found: C, 37.0; H, 1.48; N, 9.49.

Using the above procedure, and starting with the appropriate carboxylic acid anhydride and anthranilic acid, the substituted 4(3H)-quinazolinones indicated are prepared.

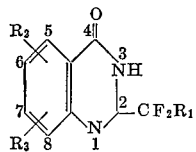

| R₁ | R₂ | R₃ | M.P., °C. |
|---|---|---|---|
| F | H | 7-NO₂ | 205–206 |
| F | H | 7-Cl | 196–198 |
| F | 6-Cl | 8-Cl | 221–222.5 |
| F | 6-Br | 8-Br | 260–262 |
| F | 6-I | 8-I | 316–318 |
| F | 5-Cl | 7-Cl | 249–251 |
| F | 5-Cl | 8-Cl | 261–262 |
| CF₃ | 6-Cl | 8-Cl | 227–228 |
| F | H | 6-Cl | 253–254 |
| F | 6-Cl | 7-Cl | 224–226 |
| F | H | 6-F | 245–246 |
| F | 7-Cl | 8-Cl | 275–276 |
| F | H | 8-Cl | 250–252 |
| CF₃ | H | 6-Cl | 244–246 |
| F | H | 6-I | 272–273 |
| F | H | 8-I | 274–276 |
| F | 6-Br | 8-CF₃ | 212–214 |
| F | 6-Br | 7-Cl | 225–227 |
| F | 6-Cl | 8-Br | 239 |
| F | 6-Cl | 8-CH₃ | 248 |
| F | 6-Br | 8-Cl | 246–247 |
| F | 6-Cl | 8-CH₂O | 282 |
| F | H | 7-CN₃ | 253–254 |
| CF₃ | H | 7-CH₃ | 215–216 |

EXAMPLE 2

2-perfluoroethyl-4(3H)-quinazolinone (R₁=CF₃; R₂, R₃=H)

To an ice cold solution of 25 g. (0.182 mole) of anthranilamide and 10.8 g. (0.138 mole) of pyridine in 200 ml. of dry tetrahydrofuran is added slowly 37.5 g. (0.21 mole) of perfluoropropionyl chloride. The resulting slurry is filtered and the filtrates evaporated to dryness to give 2-perfluoropropionamidobenzamide, which triturated with 1N HCl to give 47.5 g. of an off-white solid melting at 141–144° C. After drying briefly, the solid is heated to 150–165° C. for 1.5 hours and then allowed to cool to room temperature. The resulting product is dissolved in 50 ml. of 1N sodium hydroxide, filtered, and the filtrate acidified to give 35.8 g. (79%) of the desired compound as an off-white solid, m.p. 200–203° C. This solid is recrystallized from chloroform to give 31.0 g. (68%) of a colorless solid, m.p. 201–203° C.

*Anal.*—Calc'd for C₁₀H₅F₅N₂O: C, 45.5; H, 1.9; N, 10.6. Found: C, 45.3; H, 1.9; N, 10.8.

Starting with the appropriate acid chloride and anthranilamide, and employing the above procedure, the following quinazolinones are synthesized: 2-trifluoromethyl-4(3H)-quinazolinone, m.p. 242–244° C.; 2-perfluoropropyl-4(3H)-quinazolinone, m.p. 158–160° C.; 2-trifluoromethyl-6-nitro-4(3H)-quinazolinone, m.p. 238–240° C.; 2-perfluoroethyl-6-nitro-4(3H)-quinazolinone, m.p. 209–211° C.; and 2-perfluoropropyl-6-nitro-4(3H)-quinazolinone, m.p. 177–179° C.

EXAMPLE 3

Employing the indicated procedure, and starting with the requisite reagents, the following quinazolinones are prepared:

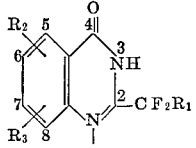

| R₁ | R₂ | R₃ | Procedure |
|---|---|---|---|
| n-C₃F₇ | 6-Cl | 7-Cl | Example 1. |
| n-C₃F₇ | H | 7-Cl | Do. |
| n-C₃F₇ | H | 8-Br | Do. |
| C₂F₅ | 6-F | 8-F | Do. |
| n-C₄F₉ | H | 6-I | Do. |
| CF₃ | 6-CH₃ | 8-NO₂ | Do. |
| n-C₃F₇ | 6-Cl | 8-CF₃ | Example 2. |
| C₂F₅ | H | 6-Br | Do. |
| C₂F₅ | H | 6-NO₂ | Do. |
| C₂F₅ | 7-CH₃ | 8-Cl | Example 1. |
| n-C₄F₉ | 7-CH₃ | 8-Br | Do. |
| CF₃ | 6-CH₃ | 8-Cl | Do. |
| F | 6-CH₃ | 8-Br | Do. |

EXAMPLE 4

2-trifluoromethyl-6,8-dichloro-4(3H)-quinazolinone (R₁=F; R₂=6-Cl; R₃=8-Cl)

To a cooled solution of 25 g. (0.122 mole) of 3,5-dichloroanthranilamide in 500 ml. of ethyl acetate is added dropwise over a period of 15 minutes 28.2 g. (0.135 mole) of trifluoroacetic anhydride in 30 ml. of ethyl acetate. The solution is stirred at room temperature for an additional 10 minutes and then the excess anhydride, trifluoroacetic acid and ethyl acetate are removed *in vacuo*. The resulting white solid is dissolved in a 1N sodium hydroxide solution at 60–70° C. The solution is then cooled and filtered, and the filtrate acidified. The resulting precipitate is filtered and dried to give 32.6 g. (94.5% yield) of a colorless solid melting at 218–220° C. The product is identical to that formed by the process of Example 1.

EXAMPLE 5

2-difluorochloromethyl-4(3H)-quinazolinone (R₁=Cl; R₂, R₃=H)

To a suspension of 80 ml. of tetrahydrofuran containing 10.0 g. (0.0735 mole) of anthranilamide and cooled to 0° C. in an ice-salt bath is added 4.4 g. of pyridine followed by 10.9 g. (0.0735 mole) of difluorochloroacetyl chloride over a period of 1.5 hours. After this time an additional 2.0 g. of the acid chloride is added and the suspended solids filtered. The filtrate is concentrated to dryness, triturated with 1N HCl and filtered, m.p. 140–144° C. Five grams of the dried intermediate is heated to 150° C. for 1 hour and then dissolved with 1N NaOH. The insolubles are filtered and the product precipitated from the filtrate by the addition of 12N HCl, m.p. 241–244° C. Recrystallization from ethanol-water provides the pure product, 3.0 g., m.p. 243–244° C.

By a similar procedure the 2-difluorochloromethyl-4(3H)-quinazolinones below are also prepared:

| Compound: | M.p., °C. |
|---|---|
| 2 - difluorochloromethyl - 6-chloro-4(3H)-quinazolinone | 260–262 |
| 2 - difluorochloromethyl - 6-bromo-4(3H)-quinazolinone | 264–265 |
| 2 - difluorochloromethyl - 7-chloro-4(3H)-quinazolinone | 206–208 |
| 2 - difluorochloromethyl - 6-nitro-4(3H)-quinazolinone | 238–239 |
| 2 - difluorochloromethyl - 6,8 - dichloro-4(3H)-quinazolinone | 215–216 |

EXAMPLE 6

2-difluorochloromethyl-6-bromo-8-trifluoromethyl-4(3H)-quinazolinone (R₁=Cl; R₂=6-Br; R₃=8-CF₃)

A cooled suspension of 7.0 g. (0.025 mole) of 3-trifluoromethyl-5-bromoanthranilic acid in 75 ml. of chloroform is treated with 3.9 g. (0.05 mole) of pyridine and the resulting solution maintained below 10° C. while 7.4 g. (0.05 mole) of chlorodifluoroacetyl chloride is added dropwise. The reaction mixture is allowed to warm to room temperature, and is then heated to reflux for 3 hours. The mixture is cooled in an ice bath, saturated with ammonia gas, and, finally evaporated to dryness. Trituration of the residue with 1N hydrochloric acid solution provides, after filtration and drying, 8.35 g., m.p. 155–160° C. of the crude product. The crude material is dissolved in 75 ml. of 1N sodium hydroxide solution, the insolubles filtered, and the product precipitated with 6N hydrochloric acid and recrystallized from benzenehexane, 2.09 g., m.p. 188–189° C.

Replacing the above-mentioned anthranilic acid with 3-trifluoromethyl-5-chloroanthranilic acid in the above procedure provides 2-difluorochloromethyl-6-chloro-8-trifluoromethyl-4(3H)-quinazolinone, m.p. 170° C.

EXAMPLE 7

Starting with the appropriate anthranilamide and chlorodifluoroacetyl chloride, and employing the procedure of Example 5, the following congeners are synthesized:

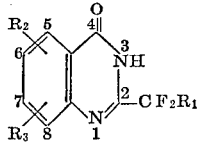

| R₁ | R₂ | R₃ |
|---|---|---|
| Cl | 6-Cl | 7-Cl |
| Cl | 6-Cl | 7-Br |
| Cl | 6-Cl | 7-F |
| Cl | 6-Br | 7-F |
| Cl | 6-F | 7-Cl |
| Cl | 6-F | 7-F |
| Cl | 7-Cl | 8-Cl |
| Cl | H | 8-F |
| Cl | H | 6-I |
| Cl | 7-CH₃ | 8-Cl |
| Cl | 7-CH₃ | H |
| Cl | 6-CH₃ | 8-Cl |
| Cl | 6-CH₃ | 8-Br |
| Cl | 6-CF₃ | 7-Cl |
| Cl | 7-F | 6-NO₂ |
| Cl | 6-CH₃ | 8-NO₂ |

EXAMPLE 8

2-difluoromethyl-4(3H)-quinazolinone
(R₁=H; R₂, R₃=H)

A mixture of 10 g. (0.073 mole) of anthranilamide and 10 g. (0.104 mole) of difluoroacetic acid is heated to reflux overnight. The excess acid is removed by distillation and the residual intermediate is heated at 200° C. for one hour. Upon cooling, the reaction mixture is dissolved in 1N sodium hydroxide solution and filtered from a small amount of insolubles. Acidification of the filtrate with 12N hydrochloric acid, followed by filtration of the precipitated product and subsequent recrystallization from ethanol provides 10 g. of the desired product, m.p. 214–217° C.

Starting with the appropriately substituted anthranilamide and difluoroacetic acid, and repeating the above procedure, the following analogs are synthesized:

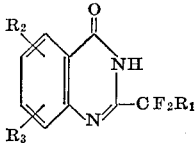

| R₁ | R₂ | R₃ | M.P., ° C. |
|---|---|---|---|
| H | H | 6-Cl | 208–209 |
| H | H | 6-Br | 216–217 |
| H | H | 7-Cl | 247–249 |
| H | H | 6-NO₂ | 240–242 |
| H | 6-Cl | 8-Cl | 240–241 |
| H | 6-Br | 8-Br | 265–266 |
| H | 6-Cl | 8-CF₃ | 178–180 |

EXAMPLE 9

Again, the procedure of Example 8 is repeated, employing the requisite anthranilamide and difluoroacetic acid, to provide the following compounds:

2-difluoromethyl-6-fluoro-4(3H)-quinazolinone,
2-difluoromethyl-7-fluoro-4(3H)-quinazolinone,
2-difluoromethyl-6-iodo-4(3H)-quinazolinone,
2-difluoromethyl-6-fluoro-8-trifluoromethyl-4(3H)-quinazolinone,
2-difluoromethyl-6-chloro-8-bromo-4(3H)-quinazolinone,
2-difluoromethyl-7-methylthio-4(3H)-quinazolinone,
2-difluoromethyl-6-methylthio-7-chloro-4(3H)-quinazolinone,
2-difluoromethyl-6-nitro-5-methylthio-4(3H)-quinazolinone,
2-difluoromethyl-6-methylthio-7-bromo-4(3H)-quinazolinone,
2-difluoromethyl-6-nitro-8-methylthio-4(3H)-quinazolinone and
2-difluoromethyl-6,8-difluoro-4(3H)-quinazolinone.

EXAMPLE 10

2-(2-chloro-1,1,2-trifluoroethyl)-4(3H)-quinazolinone
(R₁=CHClF; R₂, R₃=H)

A mixture of 5.44 g. (0.04 mole) of anthranilamide and 10.0 g. (0.061 mole) of 3-chloro-2,2,3-trifluoropropionic acid is heated with an oil bath. At 120° C. the liquified mixture sets-up solid, and reliquifies at a bath temperature of about 138° C. Heating is continued for an additional 3–4 hours at 150–160° C., at which time a solid commences to precipitate from the solution. The cooled reaction mixture is slurried several times with benzene, and the combined benzene layers concentrated *in vacuo* to an oily solid, which on trituration with ethyl ether gives 3.0 g. of the desired product in two crops, m.p. 187–188° C. and 185–186° C. The analytical sample is recrystallized from hexane-acetone.

*Anal.*—Calc'd for C₁₀H₆N₂OClF₃: C, 45.7; H, 2.3; N, 10.7. Found: C, 46.2; H, 2.4; N, 11.4.

Repeating the above procedure and starting with the requisite anthranilamide the following products are formed: 2-(2-chloro-1,1,2-trifluoroethyl)-6-chloro-4(3H)-quinazolinone, m.p. 201–202° C.; 2-(2-chloro-1,1,2-trifluoroethyl) - 7 - chloro-4(3H)-quinazolinone, m.p. 188–189° C.; 2-(2-chloro-1,1,2-trifluoroethyl)-6,8-dichloro-4(3H)-quinazolinone, m.p. 166–167° C.; and 2-(2-chloro-1,1,2 - trifluoroethyl)-6-nitro-4(3H)-quinazolinone, m.p. 212–214° C.

EXAMPLE 11

2-(1,1,2,2-tetrafluoroethyl)-4(3H)-quinazolinone
(R₁=CHF₂; R₂, R₃=H)

In a manner similar to Example 10, 6.80 g. (0.05 mole) of anthranilamide and 8.76 g. (0.06 mole) of 2,2,3,3-tetrafluoropropionic acid are heated together in an oil bath to the reflux temperature (148° C.), and maintained at this temperature for 5 hours. The reaction mixture is cooled, and the flask contents recrystallized from benzene, 3.8 g. The crude product is dissolved in 1N sodium hydroxide, filtered from some insolubles, and the filtrate acidified with hydrochloric acid. The precipitated product, 2.5 g., m.p. 190–192° C. is purified by recrystallization from cyclohexane.

*Anal.*—Calc'd for C₁₀H₆N₂OF₄: C, 48.8; H, 2.5; N, 11.4. Found: C, 49.8; H, 2.6; N, 11.7.

By employing 5-chloroanthranilamide in place of anthranilamide in the above procedure, 2-(1,1,2,2-tetrafluoroethyl)-6-chloro-4(3H) - quinazolinone is prepared, m.p. 218–219° C.

EXAMPLE 12

The experimental procedure of Example 11 is again repeated, starting with the appropriate anthranilamide and propionic acid, to prepare the following compounds:

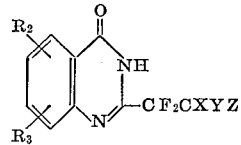

| R₂ | R₃ | X | Y | Z |
|---|---|---|---|---|
| H | 6-Br | H | H | H |
| H | 7-Cl | H | H | H |
| H | 6-I | H | H | H |
| H | 6-I | H | H | F |
| 6-Cl | 8-Cl | H | H | F |
| H | 6-F | H | H | F |
| 6-Br | 8-CF₃ | H | H | H |
| H | 6-NO₂ | H | H | H |
| H | 7-CH₃ | H | H | H |
| 6-CH₃ | 8-Cl | H | H | F |
| H | H | H | H | F |

TABLE—Continued

| R₂ | R₃ | X | Y | Z |
|---|---|---|---|---|
| H | H | H | H | H |
| 6-CH₃ | 8-NO₂ | H | H | F |
| H | H | H | H | Cl |
| 5-Cl | 8-Cl | H | H | Cl |
| 6-Br | 8-Br | H | H | Cl |
| H | 8-I | H | H | Cl |
| H | 7-CH₃ | H | Cl | Cl |
| 6-CH₃ | 8-Cl | H | Cl | Cl |
| 6-Br | 8-Cl | H | Cl | Cl |
| 6-Cl | 8-Cl | Cl | Cl | Cl |
| H | 6-NO₂ | Cl | Cl | Cl |
| 6-NO₂ | 7-F | Cl | Cl | Cl |
| H | 6-F | Cl | Cl | Cl |
| 6-Br | 8-CF₃ | Cl | F | Cl |
| H | H | Cl | F | Cl |
| H | 7-Cl | Cl | F | Cl |
| H | 8-I | Cl | F | Cl |
| 6-Cl | 8-Cl | F | F | Cl |
| H | 7-CH₃ | F | F | Cl |
| 6-Cl | 8-NO₂ | F | F | Cl |
| H | 7-CH₃ | H | Cl | F |
| 6-CH₃ | 8-Cl | H | Cl | F |
| H | 6-I | H | Cl | F |
| H | 7-Cl | H | Cl | F |
| 6-Br | 8-CF₃ | H | F | F |
| H | H | H | F | F |
| 6-Cl | 8-Cl | H | F | F |

EXAMPLE 13

2-trifluoromethyl-7-methyl-4(3H)-quinazolinone
($R_1$=F; $R_2$=H; $R_3$=CH₃)

To 5.0 g. (0.033 mole) of 4-methylanthranilic acid in 75 ml. of ethyl acetate is added dropwise with cooling 21 g. (0.099 mole) of trifluoroacetic anhydride. The reaction mixture is allowed to warm to room temperature and remain for several days. The mixture is evaporated to dryness and the residue treated with acetonitrile saturated with ammonia gas. After several hours the mixture is evaporated *in vacuo*, the residue treated with 1N sodium hydroxide and filtered. Acidification of the filtrate with 6N hydrochloric acid precipitates the crude product which on recrystallization from ethanol provides 1.6 g., m.p. 253–254° C., of the desired product.

In a similar manner are prepared 2-trifluoromethyl-6,7-dimethyl-4(3H)-quinazolinone, m.p. 269–270° C.; 2-trifluoromethyl-6-chloro-8-methyl - 4(3H) - quinazolinone, m.p. 248° C.; 2-perfluoroethyl-7-methyl-4(3H)-quinazolinone, m.p. 278–279° C.; 2-trifluoromethyl - 6,8 - dimethyl-4(3H)-quinazolinone, m.p. 244° C.; 2-trifluoromethyl-6-methyl-4(3H)-quinazolinone, m.p. 228° C.; and 2-trifluoromethyl-8-methyl-4(3H)-quinazolinone, m.p. 228–229° C.

EXAMPLE 14

Starting with 3.0 g. (13.6 mmoles) of 3,5-dichloro-4-methylanthranilic acid and 8.4 g. (40 mmoles) of trifluoroacetic anhydride and 60 ml. of ethyl acetate, and following the general procedure of Example 13 provides, after recrystallization from isopropanol, 2.45 g., m.p. 272–273° C., of 2-trifluoromethyl - 5,8 - dichloro-6-methyl-4(3H)-quinazolinone.

Employing the same above procedure and starting with the appropriate reagents, 2-trifluoromethyl-6,7,8-trichloro-4(3H)-quinazolinone, m.p. 265–267° C. and 2-trifluoromethyl-6,7-dichloro-8-methoxy-4(3H)-quinazolinone, m.p. 242–243° C., are prepared.

EXAMPLE 15

A solution of 2-trifluoromethyl-6,8-dichloro-7-carboxy-4(3H)-quinazolinone in 30 ml. of thionyl chloride is heated to reflux under a nitrogen atmosphere for 3–4 hours. The excess thionyl chloride is removed under reduced pressure, the last traces being removed employing acetonitrile as a chaser distillate. The residue is dissolved in 100 ml. of acetonitrile and separated into 33 ml. portions. One such portion is treated with 20 ml. of ethylamine in the same solvent at room temperature. After one hour, the mixture is evaporated and the residue treated with water and 6N hydrochloric acid. The precipitate product, 2-trifluoromethyl-6,8-dichloro-7-(N - ethylcarbamyl)-4(3H)-quinazolinone, is recrystallized from methanol, 910 mg., m.p. 370–371° C.

Treating the remaining portions of the acid chloride with ammonia, diethylamine, morpholine and ethanolamine in place of ethylamine there is obtained 2-trifluoromethyl-6,8-dichloro-7-carbamyl-4(3H)-quinazolinone, m.p. 342–344° C., 2-trifluoromethyl-6,8-dichloro - 7 - (N,N-diethylcarbamyl) - 4(3H) - quinazolinone, m.p. 234–236° C., respectively, 2 - trifluoromethyl-6,8-dichloro-7-morpholinocarbonyl-4(3H)-quinazolinone, m.p. 269–270° C. and 2-trifluoromethyl-6,8-dichloro - 7 - (N-2-hydroxyethylcarbamyl)-4(3H)-quinazolinone, m.p. 316° C., dec.

EXAMPLE 16

2-trifluoromethyl-6,8-dichloro-4(3H)-quinazolinone sodium salt

A suspension of 4.46 g. (0.158 mole) of 2-trifluoromethyl-6,8-dichloro-4(3H)-quinazolinone in 50–60 ml. of water is stirred rapidly while sufficient 0.5N sodium hydroxide is added to provide a solution of pH 8.5. A small amount of particulate matter is filtered and the filtrate evaporated to dryness under reduced pressure. The residual white solid is triturated with chloroform, filtered and oven dried at 45° C., 4.6 g., m.p. 365° C.

In a similar manner, the sodium, potassium and lithium salts of the compounds in Examples 1–3 and 5–12 are prepared by dissolving approximately 0.01 mole of these compounds in aqueous solutions containing equivalent amounts of sodium hydroxide, potassium hydroxide, and lithium hydroxide, respectively, followed by lyophilization of the resultant mixtures.

EXAMPLE 17

2-trifluoromethyl-6,8-dichloro-4(3H)-quinazolinone
*n*-octylamine salt

To a solution of 710 mg. (2.5 mmoles) of 2-trifluoromethyl-6,8-dichloro-4(3H)-quinazolinone in 20 ml. of methanol is added 320 mg. (2.5 mmoles) of *n*-octylamine, and the solution allowed to stir for 15–20 minutes. Removal of the solvent *in vacuo* provides the desired salt as an oil, which crystallizes on standing, 1.01 g., m.p. 100–101° C.

By a similar procedure, starting with the appropriate primary amine, the congeners of Examples 1–3 and 5–12 are converted to their primary amine salts.

EXAMPLE 18

2-trifluoromethyl-6,8-dichloro-4(3H)-quinazolinone,
N,N-dimethyl-*n*-dodecylamine salt To 20 ml. of methanol is added 1.0 g. (3.5 mmoles) of 2-trifluoromethyl-6,8-dichloro - 4(3H) - quinazolinone and 2.5 mmoles of N,N-dimethyl-*n*-cetylamine, and the reaction mixture allowed to remain at room temperature overnight. The solvent is removed under reduced pressure to provide the desired product as an oil which crystallizes on standing, 1.55 g., m.p. 35–38° C.

EXAMPLE 19

2-trifluoromethyl-6,8-dichloro-4(3H)-quinazolinone
N,N-dimethylcyclohexylamine salt In a procedure similar to that of Example 15, 710 mg. (3.5 mmoles) of 2-trifluoromethyl - 6,8 - dichloro-4(3H)-quinazolinone and 320 mg. (2.5 mmoles) of N,N-dimethylcyclohexylamine yielded 900 mg. of the desired salt, m.p. 162–163° C. By repeating the procedure of Example 15 with the products of Examples 1–3 and 5–12 and the appropriate tertiary amine, the corresponding tertiary amine salts are formed.

EXAMPLE 20

2-trifluoromethyl-6,8-dichloro-4(3H)-quinazolinone
N-methyldodecylamine salt

By a procedure similar to Example 15, equimolar amounts of 2-trifluoromethyl - 6,8 - dichloro-4(3H)-quinazolinone and N-methyldodecylamine yield the desired salt as a low melting solid.

Similarly, the compounds of Examples 1–3 and 5–12, when combined with the requisite secondary amines, form the corresponding secondary amine salts.

EXAMPLE 21

The pre-emergent and post-emergent herbicidal activity of typical representatives of the compounds of the present invention are set forth below, together with the test procedures.

Test Procedures

Pre-emergence: Appropriate weed species are seeded in individual disposable four-inch square containers and watered only in amounts adequate to moisten soil. The samples are stored for twenty-four hours before treatment.

Post-emergence: The weed species are seeded by growth-rime requirement schedules in individual disposable four-inch square containers, watered as required, and maintained under greenhouse conditions. When all the weeds have reached suitable growth development, generally first true leaf stage, those appropriate to pertaining test requirements are selected for uniformity of growth and development. One four-inch container of each weed, averaging up to fifty (Crabgrass) or more weeds per individual container, is then placed on a carrying tray for treatment. Generally eight weed containers are used in each evaluation.

Formulation and treatment: The candidate compounds are dissolved in acetone or other suitable solvent and, as appropriate, diluted in water containing wetting and emulsifying agents.

One carrying tray each of pre-emergence and post-emergence containers, mounted on a conveyer belt of 1.5 m.p.h. linear speed, trips a microswitch which in turn activates a solenoid valve and releases treatment. Candidate compounds are discharged as sprays at a rate of forty gallons (adjustable) per acre and thirty pounds (adjustable) pressure. Pre-emergence and post-emergence treatments are removed to the greenhouse and held for observation.

2,4-D (2,4-dichlorophenoxyacetic acid) is used as a reference standard.

Observations: Pre-emergence and post-emergence treatments are observed daily for interim response, final observations being made fourteen days after treatment. Any treatments inducing questionable response are held beyond the fourteen-day observation period until such responses can be confirmed.

Observations include all abnormal physiological responses of stem bending, petiole curvature, epinasty, hyponasty, retardation, stimulation, root development, necrosis and related growth regulant characteristics.

The results are listed in the following tables. The compounds of the present invention are particularly effective against deep or shallow germinating broadleaf annual weeds such as Wild Morning Glory (MNGY). This latter weed is especially troublesome in the cultivation of the soybean plant.

HERBICIDE PRE-EMERGENCE TESTS

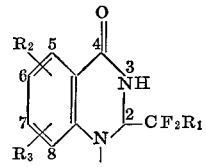

| | | | | | Plant* | | | | |
|---|---|---|---|---|---|---|---|---|---|
| $R_1$ | $R_2$ | $R_3$ | Lbs./acre | Day | BNGS | XLFX | GNFX | MSTD | MNGY |
| F | H | H | 10 | 14 | 0:0 | 0:0 | ---- | 9:RNe | 8:RN |
|  |  |  | 5 | 14 | 0:0 | 0:0 | ---- | 9:RNe | 10:RNe |
|  |  |  | 2.5 | 14 | 0:0 | 0:0 | ---- | 9:RNe | 8:RNe |
|  |  |  | 10 | 21 | 0:0 | 7:RNe | ---- | 9:RNe | 8:RNe |
|  |  |  | 5 | 21 | 0:0 | 6:RNe | ---- | 9:RNe | 10:RNe |
|  |  |  | 2.5 | 21 | 0:0 | 3:RNe | ---- | 9:RNe | 8:RNe |
| $CF_3$ | H | H | 10 | 14 | ---- | 0:0 | ---- | 10:Ne | 10:Ne |
| F | 6-Cl | 8-$CH_3O$ | 10 | 13 | 0:0 | ---- | ---- | 2:R | 4:R |
| F | 6-$CH_3O$ | 7-Cl | 10 | 13 | 0:0 | ---- | ---- | 6:R | 0:0 |
| $C_2F_5$ | H | H | 10 | 21 | 0:0 | ---- | 0:0 | 10:RNe | 9:Ne |
| F | H | 6-F | 10 | 21 | 0:0 | ---- | 8:RNe | 10:RNe | 9:RNe |
| F | H | 6-Cl | 10 | 14 | 2:R | 8:R | ---- | 9:R | 10:R |
|  |  |  | 10 | 21 | 1:R | 9:R | ---- | 10:RNe | 10:RNe |
| F | H | 6-Br | 10 | 14 | 0:0 | ---- | 10:Ne | 10:Ne | 10:Ne |
| F | H | 7-Cl | 10 | 14 | 2:R | 0:0 | ---- | 10:R | 10:R |
| F | H | 8-Cl | 10 | 14 | 0:0 | ---- | ---- | 10:R | 10:R |
|  |  |  | 10 | 21 | 0:0 | ---- | ---- | 10 | 10 |
|  |  |  | 5 | 14 | 0:0 | ---- | ---- | 7:R | 0:0 |
| F | H | 6-$NO_2$ | 10 | 14 | 0:0 | ---- | 0:0 | 6:RD | 0:0 |
| F | H | 7-$NO_2$ | 10 | 14 | 0:0 | ---- | 0:0 | 4:RC | 0:0 |
| F | H | 6-$C_6H_5$ | 10 | 14 | 0:0 | ---- | 0:0 | 0:0 | 0:0 |
| $CF_3$ | H | 6-Cl | 10 | 14 | 0:0 | ---- | 0:0 | 10:P | 8:RNe |
|  |  |  | 10 | 21 | 0:0 | ---- | 0:0 | 10:P | 10:Ne |
| $CF_3$ | H | 6-$NO_2$ | 10 | 14 | 0:0 | ---- | 5:R | 10:R | 0:0 |
|  |  |  | 10 | 21 | 0:0 | ---- | 4:R | 10:R | 0:0 |
| $C_2F_5$ | H | 6-$NO_2$ | 10 | 14 | 0:0 | ---- | 6:R | 10:R | 8:R |
|  |  |  | 10 | 21 | 0:0 | ---- | 3:R | 10:R | 8:R |
| F | 8-Cl | 6-Cl | 10 | 14 | 1:R | 6:Ro | ---- | 10:R | 10:R |
| Cl | H | H | 5 | 12 | 0:0 | 0:0 | ---- | 8:RNe | 8:RNe |
|  |  |  | 2.5 | 12 | 0:0 | 0:0 | ---- | 8:RNe | 8:R |
|  |  |  | 1.25 | 12 | 0:0 | 0:0 | ---- | 7:RNe | 7:R |
|  |  |  | 5 | 20 | 0:0 | 0:0 | ---- | 8:RNe | 10:Ne |
|  |  |  | 2.5 | 20 | 0:0 | 0:0 | ---- | 8:RNe | 8:R |
|  |  |  | 1.25 | 20 | 0:0 | 0:0 | ---- | 8:RNe | 8:R |
| F | 6-Cl | 8-$CF_3$ | 10 | 13 | 8:RNe | 8:RNe | ---- | 10:P | 10:P |
|  |  |  | 10 | 21 | 6:R | 8:RNe | ---- | 10:P | 10:P |
| F | 7-Cl | 5-Cl | 10 | 14 | 0:0 | 0:0 | ---- | 10:R | 10:R |
|  |  |  | 10 | 21 | 0:0 | 0:0 | ---- | 10:Ne | 10:Ne |
| F | 8-Cl | 5-Cl | 10 | 14 | 0:0 | 0:0 | ---- | 8:R | 0:0 |

3,840,540

TABLE—Continued

| R₁ | R₂ | R₃ | Lbs./acre | Day | BNGS | XLFX | GNFX | MSTD | MNGY |
|---|---|---|---|---|---|---|---|---|---|
| F | 7-Cl | 6-Cl | 10 | 14 | 6:R | | 7:Re | 10:Ne | 9:Ne |
|  |  |  | 10 | 21 | 5:RNe | | 9:Re | 10:Ne | 10:Ne |
| F | 8-Cl | 7-CL | 10 | 21 | 0:0 | | 0:0 | 8:REp | 10:Ne |
| CF₃ | 8-Cl | 6-Cl | 10 | 14 | 0:0 | 2:R | | 2:R | 1:RA |
| F | 8-Br | 6-Br | 10 | 14 | 0:0 | 0:0 | | 7:R | 7:RA |
| F | 8-I | 6-I | 10 | 14 | 0:0 | 0:0 | | 5:R | 1:A |
| H | H | H | 10 | 13 | 0:0 | 0:0 | | 9:RNe | 3:RDCl |
| H | H | 6-Cl | 10 | 20 | 5:R | 8:RNe | | 10:Ne | 10:Ne |
|  |  |  | 5 | 13 | 0:0 | 0:0 | | 8:R | 4:R |
| H | H | 6-Br | 10 | 19 | 7:Ne | 7:Ne | | 9:R | 9:R |
| H | H | 7-Cl | 10 | 13 | 0:0 | 0:0 | | 7:R | 0:0 |
| H | H | 6-NO₂ | 10 | 13 | 1:Ne | 0:0 | | 8:R | 2:Ne |
| H | 6-Cl | 8-Cl | 10 | 13 | 0:0 | 3:R | | 8:R | 7:R |
| H | 6-Br | 8-Br | 10 | 13 | 0:0 | 0:0 | | 5:R | 7:RA |
| H | 6-Cl | 8-CF₃ | 10 | 13 | 2:R | 4:R | | 10:P | 6:RA |
| Cl | H | 6-Cl | 10 | 13 | 0:0 | 3:R | | 10:R | 9:R |
| Cl | H | 6-Br | 10 | 20 | 0:0 | 0:0 | | 5:R | 10:R |
| Cl | H | 7-Cl | 10 | 13 | 0:0 | 0:0 | | 9:R | 10:R |
|  |  |  | 5 | 13 | 0:0 | 2:R | | 5:R | 3:R |
|  |  |  | 2 | 13 | 0:0 | 0:0 | | 3:R | 0:0 |
|  |  |  | 1 | 13 | 0:0 | 0:0 | | 3:R | 1:R |
| Cl | H | 6-NO₂ | 10 | 13 | 0:0 | 0:0 | | 8:RA | 4:R |
| Cl | 6-Cl | 8-Cl | 10 | 13 | 0:0 | 0:0 | | 8:R | 8:R |
| Cl | 6-Cl | 8-CF₃ | 10 | 13 | 0:0 | 0:0 | | 7-R | 1:A |
| Cl | 6-Br | 8-CF₃ | 10 | 13 | 0:0 | 0:0 | | 0:0 | 0:0 |
| F | H | 8-I | 10 | 19 | 0:0 | 0:0 | | 10:R | 10:R |
| F | 6-Br | 8-CF₃ | 10 | 13 | 0:0 | 0:0 | | 8:R | 9:R |
| F | 6-Br | 7-Cl | 10 | 20 | 5:R | | | 10:Ne | 10:R |
| F | 6-Cl | 8-Br | 10 | 13 | 0:0 | | | 9:R | 4:NeR |
| F | 6-Cl | 8-CH₃ | 10 | 14 | 0:0 | | | 6:Ne | 2:Ne |
| F | 6-Br | 8-Cl | 10 | 13 | 3:R | | | 10:Ne | 10:Ne |
| F | 6-Cl | 8-CH₃O | 10 | 13 | 0:0 | | | 2:R | 4:R |
| F | H | 6-CH₃O | 10 | 12 | 1:0 | | | 8:R | 8:R |
| CF₃ | H | 7-CH₃ | 10 | 13 | 0:0 | | | 0:0 | 0:0 |
| CHClF | H | H | 10 | 20 | 0:0 | | | 10:Ne | 10:Ne |
| CHF₂ | H | H | 10 | 20 | 0:0 | | | 10:RNe | 10:RNe |
|  |  |  | 8 | 26 | 3:Ne | | | 10:RNe | 9:RNe |
|  |  |  | 5 | 26 | 2:Ne | | | 10:RNe | 9:RNe |
|  |  |  | 2 | 26 | 1:Ne | | | 10:RNe | 7:RNe |
| F | H | 6-p-ClC₆H₄SO₂— | 10 | 13 | 0:0 | | | 4:R | 3:RA |
| F | 5-Cl | 8-CH₃O | 10 | 13 | 0:0 | | | 3:RO | 0:0 |
| CHF₂ | H | 6-Cl | 10 | 20 | 0:0 | | | 10:RNe | 10:RNe |
|  |  |  | 8 | 20 | 1:RCl | | | 10:RNe | 9:RNe |
|  |  |  | 5 | 20 | 0:0 | | | 10:RNe | 8:RNe |
|  |  |  | 2 | 20 | 0:0 | | | 10:RNe | 1:RNe |
| CHFCl | H | 6-Cl | 10 | 13 | 0:0 | | | 10:RNe | 0:0 |
| CHFCl | H | 7-Cl | 10 | 20 | 0:0 | | | 10:RNe | 2:A |
| CHFCl | 6-Cl | 8-Cl | 10 | 13 | 0:0 | | | 9:RNe | 1:A |
| CHFCl | H | 6-NO₂ | 10 | 13 | 0:0 | | | 4:R | 4:R |

HERBICIDE POST-EMERGENCE TESTS

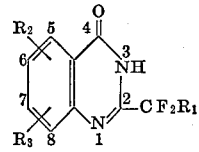

| R₁ | R₂ | R₃ | Lbs./acre | Day | MSTD | YLFX | GNFX | BNGS | CBGS | BKWT | MNGY |
|---|---|---|---|---|---|---|---|---|---|---|---|
| F | H | H | 10 | 14 | 10:Ne | 0:0 | | 0:0 | 0:0 | 10:Ne | 10:Ne |
|  |  |  | 5 | 14 | 10:Ne | 0:0 | | 0:0 | 0:0 | 10:Ne | 10:Ne |
|  |  |  | 2.5 | 14 | 10:Ne | 0:0 | | 0:0 | 0:0 | 10:Ne | 10:Ne |
| CF₃ | H | H | 10 | 14 | 10:Ne | 0:0 | | 0:0 | 0:0 | 10:Ne | 10:Ne |
| C₂F₅ | H | H | 10 | 14 | 10:Ne | | 1:Ne | 0:0 | 0:0 | 10:Ne | 9:Ne |
| F | H | 6-F | 10 | 14 | 10:Ne | | 9:Ne | 10:Ne | 1:Ne | 10:Ne | 10:Ne |
| F | H | 6-Cl | 10 | 14 | 10:Ne | 9:Ne | | 4:Ne | 3:Ne | 9:Ne | 10:Ne |
| F | H | 6-Br | 10 | 14 | 10:Ne | | 9:Ne | 10:Ne | 1:Ne | 9:Ne | 10:Ne |
| F | H | 7-Cl | 10 | 14 | 10:Ne | 2:R | | 3:RNe | 1:R | 10:Ne | 9:RNe |
| F | H | 8-Cl | 10 | 14 | 0:0 | 0:0 | | 0:0 | 0:0 | 10:Ne | 9:Ne |
|  |  |  | 5 | 14 | 0:0 | 0:0 | | 0:0 | 0:0 | 10:Ne | 10:Ne |
|  |  |  | 2.5 | 14 | 0:0 | 0:0 | | 0:0 | 0:0 | 10:Ne | 10:Ne |
|  |  |  | 1.25 | 14 | 0:0 | 0:0 | | 0:0 | 0:0 | 10:Ne | 10:Ne |
| F | H | 6-NO₂ | 10 | 14 | 0:0 | | 0:0 | 0:0 | 0:0 | 0:0 | 0:0 |
| F | H | 7-NO₂ | 10 | 14 | 8:Ne | 0:0 | | 0:0 | 0:0 | 3:Ne | 0:0 |
| F | H | 6-C₆H₅ | 10 | 14 | 9:Ne | 2:Ne | | 4:Ne | 4:Ne | 8:Ne | 1:Ne |
| CF₂ | H | 6-Cl | 10 | 14 | 10:Ne | | 1:Ne | 1:Ne | 1:Ne | 9:Ne | 10:Ne |
| F | H | 8-CH₃ | 10 | 14 | 10:Ne | | | 0:0 | | | 0:0 |
| CF₃ | H | 6-NO₂ | 10 | 14 | 8:Ne | | 1:Ne | 1:Ne | 1:Ne | 9:Ne | 2:Ne |
| C₂F₅ | H | 6-NO₂ | 10 | 14 | 8:Ne | | 1:Ne | 0:0 | 0:0 | 8:Ne | 3:Ne |
| F | 8-Cl | 6-Cl | 10 | 14 | 10:Ne | 10:Ne | | 10:Ne | 8:Ne | 9:Ne | 10:Ne |
| F | 7-Cl | 5-Cl | 10 | 14 | 10:Ne | 1:0 | | 0:0 | 0:0 | 10:Ne | 10:Ne |
| F | 8-Cl | 5-Cl | 10 | 14 | 10:Ne | 0:0 | | 1:Ne | 5:Ne | 9:Ne | 10:Ne |
| F | 7-Cl | 6-Cl | 10 | 14 | | | 10:Ne | 10:Ne | 10:Ne | 10:Ne | 10:Ne |
| F | 8-Cl | 7-Cl | 10 | 14 | 10:Ne | | 3:Ne | 5:Ne | 0:0 | 10:Ne | 10:Ne |
| CF₃ | 8-Cl | 6-Cl | 10 | 14 | 10:Ne | 1:Ne | | 4:RNe | 4:RNe | 9:Ne | 10:Ne |
| F | 8-Br | 6-Br | 10 | 14 | 10:Ne | 0:0 | | 3:R | 8:R | 8:Ne | 0:0 |
| F | 8-I | 6-I | 10 | 14 | 10:Ne | 0:0 | | 0:0 | 0:0 | 0:0 | 0:0 |
| Cl | H | H | 10 | 14 | 10:Ne | 1:Ne | | 1:Ne | 2:Ne | 8:Ne | 10:Ne |
| H | H | H | 10 | 13 | 9:Ne | 1:Ne | | 1:Ne | | | 2:Ne |

See footnotes at end of table.

TABLE—Continued

| R₁ | R₂ | R₃ | Lbs./acre | Day | MSTD | YLFX | GNFX | BNGS | CBGS | BKWT | MNGY |
|---|---|---|---|---|---|---|---|---|---|---|---|
| H | H | 6-Cl | 10 | 13 | 10:Ne | 5:Ne | | 10:Ne | | | 10:Ne |
| H | H | 6-Cl | 5 | 13 | 10:Ne | 8:Ne | | 2:Ne | | | 10:Ne |
| H | H | 6-Cl | 2 | 13 | 10:Ne | 7:Ne | | 1:Ne | | | 7:Ne |
| H | H | 6-Cl | 1 | 13 | 10:Ne | 6:Ne | | 0:0 | | | 7:Ne |
| H | H | 6-Br | 10 | 13 | 9:Ne | 8:Ne | | 7:Ne | | | 9:Ne |
| | | | 5 | 13 | 10:Ne | 3:Ne | | 3:Ne | | | 10:Ne |
| | | | 2 | 13 | 10:Ne | 1:Ne | | 1:Ne | | | 7:Ne |
| | | | 1 | 13 | 10:Ne | 1:Ne | | 1:Ne | | | 3:Ne |
| H | H | 7-Cl | 10 | 13 | 10:Ne | 0:0 | | 0:0 | | | 2:Ne |
| H | H | 6-NO₂ | 10 | 13 | 10:Ne | 2:Ne | | 2:Ne | | | 9:Ne |
| H | 6-Cl | 8-Cl | 10 | 13 | 4:Ne | 2:Ne | | 2:Ne | | | 9:Ne |
| H | 6-Br | 8-Br | 10 | 13 | 5:Ne | 0:0 | | 0:0 | | | 0:0 |
| H | 6-Cl | 8-CF₃ | 10 | 13 | 10:Ne | 2:Ne | | 2:Ne | | | 10:Ne |
| Cl | H | 6-Cl | 10 | 13 | 10:Ne | 0:0 | | 0:0 | | | 5:Ne |
| Cl | H | 6-Br | 10 | 13 | 10:Ne | 10:Ne | | 1:Ne | | | 10:Ne |
| | | | 5 | 13 | 9:Ne | 0:0 | | 0:0 | | | 4:RNe |
| | | | 2 | 13 | 6:Ne | 0:0 | | 0:0 | | | 4:RNe |
| | | | 1 | 13 | 8:Ne | 0:0 | | 0:0 | | | 4:RNe |
| Cl | H | 7-Cl | 10 | 13 | 10:Ne | 3:Ne | | 4:Ne | | | 10:Ne |
| | | | 5 | 13 | 10:Ne | 0:0 | | 0:0 | | | 3:RNe |
| | | | 2 | 13 | 10:Ne | 0:0 | | 0:0 | | | 3:RNe |
| | | | 1 | 13 | 10:Ne | 0:0 | | 0:0 | | | 3:RNe |
| Cl | H | 6-NO₂ | 10 | 13 | 10:Ne | 0:0 | | 1:Ne | | | 2:Ne |
| Cl | 6-Cl | 8-Cl | 10 | 13 | 8:Ne | 0:0 | | 2:Ne | | | 10:Ne |
| Cl | 6-Cl | 8-CF₃ | 10 | 12 | 10:Ne | 0:0 | | 1:Ne | | | 10:Ne |
| Cl | 6-Br | 8-CF₃ | 10 | 13 | 8:Ne | 0:0 | | 0:0 | | | 4:Ne |
| F | H | 8-I | 10 | 12 | | 1:Ne | | 2:Ne | | | 10:Ne |
| F | 6-Br | 8-CF₃ | 10 | 13 | 10:Ne | 8:Ne | | 4:Ne | | | 10:Ne |
| F | 6-Br | 7-Cl | 10 | 13 | 10:Ne | | | 5:RNe | | | 10:Ne |
| F | 6-Cl | 8-Br | 10 | 12 | 10:Ne | | | 4:Ne | | | 6:Ne |
| F | 6-Cl | 8-CH₃ | 10 | 13 | 10:Ne | | | 0:0 | | | 0:0 |
| F | 6-Br | 8-CH₃ | 10 | 13 | 10:Ne | | | 5:RNe | | | 8:Ne |
| F | 6-Cl | 8-CH₃O | 10 | 13 | 10:Ne | | | 3:RNe | | | 3:RNe |
| F | H | 7-CH₃ | 10 | 13 | 10:Ne | | | 1:R | | | 8:Ne |
| CF₃ | H | 7-CH₃ | 10 | 13 | 9:Ne | | | 0:0 | | | 2:Cl |
| CHFCl | H | H | 10 | 13 | 10:Ne | | | 0:0 | | | 10:Ne |
| CHF₂ | H | H | 5 | 13 | 10:Ne | | | 3:Ne | | | 10:Ne |
| | | | 2 | 13 | 10:Ne | | | 0:0 | | | 10:Ne |
| | | | 1 | 13 | 10:Ne | | | 0:0 | | | 10:Ne |
| | | | 0.5 | 13 | 10:Ne | | | 0:0 | | | 9:Ne |
| CHF₂ | H | 6-Cl | 5 | 13 | 10:Ne | | | 0:0 | | | 10:Ne |
| | | | 2 | 13 | 10:Ne | | | 3:RCl | | | 9:Ne |
| | | | 1 | 13 | 10:Ne | | | 0:0 | | | 7:Ne |
| | | | 0.5 | 13 | 10:Ne | | | 0:0 | | | 3:Ne |
| CHClF | H | 6-Cl | 5 | 13 | 10:Ne | | | 0:0 | | | 10:Ne |
| | | | 2 | 13 | 10:Ne | | | 4:RNe | | | 6:Ne |
| | | | 1 | 13 | 10:Ne | | | 2:R | | | 9:Ne |
| | | | 0.5 | 13 | 10:Ne | | | 0:0 | | | 4:Ne |
| CHClF | H | 7-Cl | 5 | 13 | 10:Ne | | | 0:0 | | | 9:Ne |
| CHClF | 6-Cl | 8-Cl | 5 | 13 | 10:Ne | | | 3:Ne | | | 8:Ne |
| CHClF | H | 6-NO₂ | 5 | 13 | 10:Ne | | | 1:Ne | | | 3:Ne |

*Plants (annual weeds): BNGS=Barnyard grass, YLFX=Yellow foxtail, GNFX=Green foxtail, MSTD=Mustard, MNGY=Wild morning glory, CBGS=Crabgrass, BKWT=Wild Buckwheat. Plant injury and response: R=Retarded or reduced, Ne=Necrosis, D=Distorted, C=Caustic, Ro=Root, P=Phytotoxicity, Ep=Epinasty, A=Albinism Cl=Chlorosis. Herbicidal numerical injury rating: 0 (no injury) to 10 (all plants killed).

HERBICIDE PRE-EMERGENCE TESTS

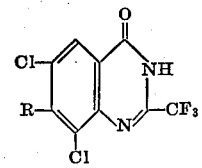

| R | Lbs./acre | Day | BNGS | YLFX | GNFX | MSTD | MNGY |
|---|---|---|---|---|---|---|---|
| Cl | 10 | 14 | 0:0 | 0:0 | | 9:RNe | 8:RCl |
| H₂NCO | 10 | 27 | 6:Ne | | | 9:RNe | 8:RNe |
| C₂H₅NHCO | 10 | 20 | 5:RNe | | | 8:RNe | 5:R |
| CH₃ | 10 | 20 | 2:R | | | 5:RNe | 0:0 |
| (C₂H₅)₂NCO | 10 | 20 | 2:Ne | | | 4:R | 5:RCl |

HERBICIDE POST-EMERGENCE TESTS

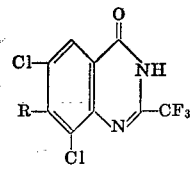

| R | Lbs./acre | Day | Plant* BNGS | YLFX | GNFX | MSTD | MNGY |
|---|---|---|---|---|---|---|---|
| Cl | 10 | 14 | 2:Ne | 0:0 | | 10:Ne | 0:0 |
| H₂NCO | 5 | 13 | 3:Ne | | | 10:Ne | 3:Ne |
| C₂H₅NHCO | 5 | 13 | 2:Ne | | | 8:Ne | 1:Ne |
| CH₃ | 5 | 13 | 3:Ne | | | 10:Ne | 4:Ne |
| (C₂H₅)₂NCO | 5 | 13 | 3:Ne | | | 5:Ne | 0:0 |

*Plants (annual weeds): BNGS=Barnyard grass, YLFX=Yellow foxtail, GNFX=Green foxtail, MSTD=Mustard, MNGY=Wild morning glory. Plant injury and response: R=Retarded or reduced, Ne=Necrosis, D=Distorted, C=Caustic, Ro=Root, Ep=Epinasty, A=Albinism, Cl=Chlorosis. Herbicidal numerical injury rating: 0 (no injury) to 10 (all plants killed).

PREPARATION A

Halogenated Acids (a) 2,2 - difluoro-3-chloropropionic acid: 2,2-difluoropropionic acid, prepared by the method of Henne et al., *J. Am. Chem. Soc.*, 69, 281 (1947), is chlorinated by the procedure of England, et al., *J. Am. Chem. Soc.*, 80, 6442 (1958), wherein chlorine gas is bubbled through a sintered glass dispersion tube into the starting acid in a quartz flask fitted with a well containing a GE H85–C3 mercury vapor lamp. After radiation overnight the product is distilled under reduced pressure.

Employing the indicated procedures, the following, non-commercial halogenated acids are prepared as intermediates leading to the products of the instant invention:

$$XYZC—CF_2CO_2H$$

| X | Y | Z | Reference |
|---|---|---|---|
| H | H | H | (a) |
| H | H | F | (b) |
| H | F | F | (c) |
| H | Cl | Cl | (e) |
| Cl | Cl | Cl | (c) |
| H | F | Cl | (c) |
| F | Cl | Cl | (c) |
| F | F | Cl | (c) |
| F | F | C₂F₅ | (d) |
| F | F | n-C₃F₇ | (e) | a Henne, et al., *J. Am. Chem. Soc.*, 69, 281 (1947).
b German Patent 1,040,177.
c England, et al., *J. Am. Chem. Soc.*, 80, 6442 (1958).
d British Patent 926,411.
e Christie, et al., *J. Org. Chem.*, 24, 246 (1959).

PREPARATION B

Halogenated Acid Anhydrides and Acid Chlorides (a) Perfluoroalkanoic acid anhydrides: The following perfluoroalkanoic acid anhydrides, not previously reported in the literature, are synthesized from the corresponding perfluoroalkanoic acid and phosphorous pentoxide according to the method as taught by England et al., *J. Am. Chem. Soc.*, 80, 6442 (1958), which comprises a slow distillation of the anhydride from a mixture of the corresponding acid and phosphorus pentoxide:

$$(XYZCCF_2CO)_2O$$

| X | Y | Z |
|---|---|---|
| F | F | n-C₃F₇ |
| F | F | C₂F₅ |

(b) Perfluoroalkanoic acid chlorides: The following acid chlorides are prepared from the acid and benzotrichloride, essentially the method employed by England et al.:

$$CF_3(CF_2)_4COCl$$

$$CF_3(CF_2)_3COCl$$

$$CF_3(CF_2)_2COCl$$

PREPARATION C

Anthranilic Acids (a) The following known anthranilic acids are synthesized as intermediates leading to the products of the present invention:

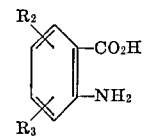

| R₂ | R₃ | Reference | X R₂ | R₃ | Reference |
|---|---|---|---|---|---|
| 5-Br | H | (a) | X5-F | H | (z) |
| 4-NO₂ | H | (b) | X3-Cl | H | (c) |
| 4-Cl | H | (c) | X5-I | H | (a) |
| 3-Cl | 5-Cl | (d) | X3-I | H | (i) |
| 3-Br | 5-Br | (e) | X3-Br | 5-Cl | (i) |
| 4-Cl | 6-Cl | (c) | X3-Cl | 5-Br | (i) |
| 3-Cl | 6-Cl | (c) | X3-Br | H | (?) |
| 5-Cl | H | (?) | X4-F | H | (z) |
| 4-Cl | 5-Cl | (j) | X3-NO₂ | 5-CH₃ | (?) |
| | | | X3-Br | 5-CH₃ | (k) | a Petrov, et al., *Zhur. Obshch Biol.*, 23, 663 (1953).
b Justoni, et al., 3, 509 (1948).
c Sadler, et al., *J. Am. Chem. Soc.*, 78, 1251 (1956).
d *Org. Syn.* 31, 96 (1951).
e Sheibley, *J. Org. Chem.*, 17, 221 (1952).
f Breukink, et al., 76, 40 (1957).
j Baker, et al., *J. Org. Chem.*, 17, 149 (1952).
z Volcani, et al., *J. Biol. Chem.*, 207, 411 (1954).
? Chaudhari, et al., 19, Sect. A., Pt. 3, Sci. No. 28, 65 (1950), *C.A.* 47, 1652b.
? Sen, et al., *J. Indian Chem. Soc.*, 36, 787 (1959).
? James, et al., 61, 295 (1968).
? Cassibaum, 23, 301 (1964).
k French Patent 1,426,488.

(b) 3-trifluoromethylanthranilic acid: To a solution of 30 g. of 7-trifluoromethylisatin in 193 ml. of 3N sodium hydroxide solution, cooled in an ice bath, is added dropwise 34.1 ml. of 30% hydrogen peroxide. The temperature is maintained at 0–10° C. during the peroxide addition, allowed to rise to room temperature after the addition is complete, and, finally, brought to 85° C. on a steam bath for 15–20 minutes. The reaction mixture is filtered, cooled, and the product precipitated by the addition of concentrated hydrochloric acid. The crude product is dissolved in sodium bicarbonate, filtered and reprecipitated with acid, 24.1 g., m.p. 155–157° C. The analytical sample is recrystallized from isopropanol-water, m.p. 158–160° C.

(c) 3-trifluoromethyl-5-bromoanthranilic acid: A solution of 20 g. (0.098 mole) of 3-trifluoromethylanthranilic acid and 33.8 g. (0.2 mole) of 48% hydrobromic acid in 200 ml. of water is heated to 70–75° C. on a steam bath while 11 g. (0.098 mole) of 30% hydrogen peroxide is added at such a rate that the temperature is maintained at 70° C. When the addition is complete, heating is continued for one hour, followed by cooling and filtration of the precipitated product, 25.6 g., m.p. 179–180° C.

(d) 3 - trifluoromethyl-5-chloroanthranilic acid: In a manner similar to the procedure of Preparation C(c), 67.5 g. of 3-trifluoromethylanthranilic acid and 1 l. of 12N hydrochloric acid in 1 l. of water, on treatment with 34.8 g. of 30% hydrogen peroxide, provided 72 g. of the desired product, m.p. 163–165° C.

(e) 3-methyl-5-chloro- and 3-chloro-5-methylanthranilic acids: Starting with the commercially available 3-methyl- and 5-methylanthranilic acids and repeating the procedure of C-d the above mentioned anthranilic acids are prepared.

(f) 2 - trifluoromethyl-6,8-dichloro-6-carboxy-4(3H)-quinazolinone: To 65.6 g. of stannous chloride trihydrate and 320 ml. of 12N hydrochloric acid in 320 ml. of water, heated to 60° C. is added, portionwise, 20.8 g. of commercially available nitroterephthalic acid. The solution is heated to 70–80° C. for 3 hours and allowed to stand at room temperature overnight. The precipitate, aminoterephthalic acid, is filtered and slurried in ethanol, 16.2 g. m.p. 334–336° C.

Thirty grams of aminoterephthalic acid in 600 ml. acetic acid is cooled in a water bath (20° C.) during the addition of 80 ml. of sulfuryl chloride. When the addition is complete the mixture is allowed to stand at room temperature for 3–4 hours, and is then concentrated under reduced pressure to one-third volume. The concentrated reaction mixture is added to water and the precipitated solid, 2-amino-3,5-dichloroterephthalic acid, is filtered and dried, 16.8 g., m.p. 278° C.

The above acid in 250 ml. of ethyl acetate is cooled in a water bath while 42 g. of trifluoroacetic anhydride is added portionwise. The reaction mixture is allowed to stir at room temperature overnight followed by the removal of the excess anhydride and solvent by distillation. The residue is dissolved in acetonitrile and the solution saturated with ammonia. After several hours, the mixture is evaporated to dryness, and the residue dissolved in 1N sodium hydroxide. The solution is filtered, rendered acid with 6N hydrochloric acid and the resulting precipitate filtered and dried, 11.0 g., m.p. 337–338° C. The product, 2-trifluoromethyl - 6,8 - dichloro-7-carboxy-4(3H)-quinazolinone, is used in subsequent steps without further purification.

(g) 3,5-dichloro-4-methylanthranilic acid: To a solution of 14.0 g. of 4-methylanthranilic acid in 300 ml. of acetic acid at room temperature is added 35 ml. of sulfuryl chloride. When the precipitation of the solids ceases the mixture is cooled and poured into water. The aqueous solution is decanted, and the residual solid is triturated with acetonitrile and filtered. Recrystallization from methanol provides 3.0 g., m.p. 209–212° C., of the desired intermediate.

(h) 4-chloro-5-bromoanthranilic acid: To a solution of 100 g. (0.585 mole) of 4-chloroanthranilic acid in 2.5 l. of methanol and cooled to —50° C. is added dropwise 93.5 g. (0.585 mole) of bromine. When the addition is complete, the reaction mixture is allowed to warm to room temperature and stir overnight. Approximately half the solvent is removed in vacuo, and the reaction poured into water. The product is filtered, dissolved in 2.3 l. of 1N sodium hydroxide solution and reprecipitated with concentrated hydrochloric acid, 146 g., m.p. 216–218° C.

PREPARATION D

Anthranilamides (a) The following known arthanilamides are synthesized as intermediates leading to the products of the instant invention:

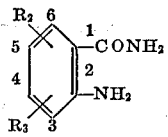

| $R_2$ | $R_3$ | Reference |
|---|---|---|
| 4-Cl | H | (a) |
| 5-Cl | H | (b) |
| 3-Cl | 5-Cl | (b) |
| 6-Cl | H | (c) |
| 3-Br | 5-Br | (d) |
| H | 4-CH₃ | (e) | a Grundmann, et al., J. Org. Chem., 24, 272 (1959).
b Gadekar, et al., J. Org. Chem., 26, 613 (1961).
c Koopman, Rec. trav. chim., 80, 1075 (1961).
d Sheibley, J. Org. Chem., 17, 221 (1952).
e Kakatori, et al., Gifu Yakka Daigaku Kiyo, 8, 35 (1958).

(b) The anthranilamides previously unreported in the chemical literature are most conveniently prepared by treatment of the corresponding anthranilic acid with phosgene, and subsequent reaction of the thus-produced isatoic anhydride with dilute ammonium hydroxide following the procedure of Staiger et al., J. Org. Chem., 13, 347 (1948); the new anthranilamides prepared are as follows:

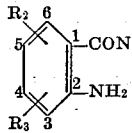

| $R_2$ | $R_3$ | $R_2$ | $R_3$ |
|---|---|---|---|
| 5-NO₂ | H | 4-Cl | 5-F |
| 3-Cl | 4-CH₃ | 4-F | 5-F |
| 3-CF₃ | 5-Cl | 3-Cl | 4-Cl |
| 3-CF₃ | 5-CH₃ | 3-F | H |
| 3-Cl | 5-CH₃ | 5-I | H |
| 5-Br | H | 3-NO₂ | 5-CH₃ |
| 4-Cl | 5-Cl | 3-Cl | 6-Cl |
| 4-Br | 5-Cl | 3-Cl | 5-Br |
| 4-F | 5-Cl | 4-F | H |
| 4-F | 5-Br | 4-F | 5-NO₂ |
| 4-Cl | 5-CF₃ | 5-F | H |
| 3-Br | 5-Cl | | |
| 3-CF₃ | 5-Br | | |
| 3-NO₂ | 5-Cl | | |
| 3-I | H | | |
| 3-CF₃ | 5-F | | |

What is claimed is:

1. A compound selected from the group having the formulae:

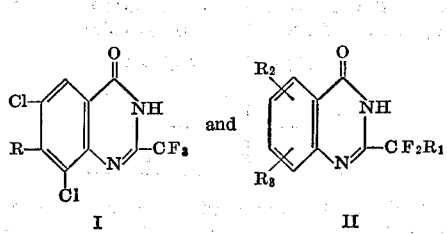

and the alkali metal and alkylamine salts thereof selected from the group consisting of mono-, di and trialkyl amines wherein the alkyl portion contains from 1 to 12 carbon atoms, wherein:

R is selected from the group consisting of Cl, $CH_3O$, $CH_3$, carbamyl and mono- and dialkylcarbamyl wherein each said alkyl contains from 1 to 3 carbon atoms;

$R_1$ is selected from the group consisting of H, F, Cl, perfluoroalkyl containing from 2 to 4 carbon atoms and —CXYZ wherein X, Y and Z are each selected from the group consisting of H, F and Cl;

$R_2$ is selected from the group consisting of H, F, Cl, Br, I, $CH_3$ and $CF_3$; and $R_3$ is selected from the group consisting of H, F, Cl, Br and $NO_2$.

2. A compound of claim 1, Formula II, wherein $R_1$ is F and $R_2$ is selected from the group consisting of F, Cl, Br and I.

3. A compound of claim 1, Formula II, wherein $R_1$ is —CXYZ wherein X, Y and Z are each selected from the group consisting of H, F, and Cl and $R_2$ is H.

4. 2-trifluoromethyl - 6 - fluoro-4(3H)-quinazolinone, the compound of claim 2 wherein $R_2$ is 6-F and $R_3$ is H.

5. 2-trifluoromethyl - 6,8 - dichloro-4(3H)-quinazolinone, the compound of claim 2 wherein $R_2$ is 6-Cl and $R_3$ is 8-Cl.

6. 2-perfluoroethyl - 4(3H) - quinazolinone, the compound of claim 3 wherein X, Y and Z are each F, and $R_3$ is H.

7. 2-(2-chloro - 1,1,2 - trifluoroethyl)-4(3H)-quinazolinone, the compound of claim 3 wherein X to H, Y is F, Z is Cl and $R_3$ is H.

References Cited

Bogentoft et al., C.A. *72*, 11916r (1970); Abstract of Acta Pharm. Suecica *1969*, 6(4), 489–500.

RAYMOND V. RUSH, Primary Examiner

U.S. Cl. X.R.

71—92; 260—256.4 Q, 256.5 R, 518 A, 558 A

UNITED STATES PATENT OFFICE
CERTIFICATE OF CORRECTION

PATENT NO. : 3,840,540
DATED : October 8, 1974
INVENTOR(S) : BERYL WILLIAM DOMINY ET AL It is certified that error appears in the above-identified patent and that said Letters Patent are hereby corrected as shown below:

Column 5 in structural formula in Example 1, change " 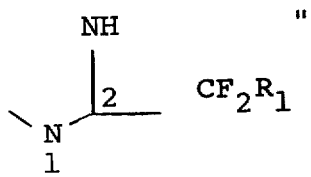 "

to -- 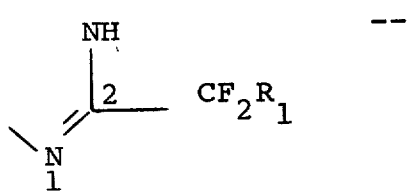 --

Column 18 in the Table under "Reference", both occurrences, change the following and the corresponding footnotes below the Table:

"7", first occurrence, to -- f --.

"J" to -- g --.

"Z", first occurrence, to -- h --.

"1", first occurrence, to -- i --.

"1", second occurrence, to -- j --.

"1", third occurrence, to -- j --.

"?" to -- k --.

"Z", second occurrence, to -- h --.

UNITED STATES PATENT OFFICE
CERTIFICATE OF CORRECTION

PATENT NO. : 3,840,540
DATED : October 8, 1974
INVENTOR(S) : BERYL WILLIAM DOMINY ET AL It is certified that error appears in the above-identified patent and that said Letters Patent are hereby corrected as shown below:

"7", second occurrence, to -- 1 --, i.e. a small el which is the twelfth letter of the English alphabet.
"&" to -- m --.

Signed and Sealed this eleventh Day of November 1975

[SEAL]

Attest:

RUTH C. MASON
*Attesting Officer*

C. MARSHALL DANN
*Commissioner of Patents and Trademarks*